US009577822B1

(12) United States Patent
Pedersen

(10) Patent No.: US 9,577,822 B1
(45) Date of Patent: Feb. 21, 2017

(54) SECURE BITSTREAM AUTHENTICATION

(71) Applicant: Altera Corporation, San Jose, CA (US)

(72) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 478 days.

(21) Appl. No.: 14/044,574

(22) Filed: Oct. 2, 2013

Related U.S. Application Data

(60) Provisional application No. 61/744,879, filed on Oct. 3, 2012, provisional application No. 61/744,825, filed on Oct. 3, 2012.

(51) Int. Cl.
| | | |
|---|---|---|
| *H04K 1/00* | (2006.01) | |
| *H04L 9/00* | (2006.01) | |
| *H04L 9/30* | (2006.01) | |
| *H04L 9/06* | (2006.01) | |
| *G06F 21/30* | (2013.01) | |
| *H04L 29/06* | (2006.01) | |
| *H04L 9/32* | (2006.01) | |
| *H04L 9/18* | (2006.01) | |

(52) U.S. Cl.
CPC ............ *H04L 9/0631* (2013.01); *G06F 21/30* (2013.01); *H04L 9/18* (2013.01); *H04L 9/32* (2013.01); *H04L 9/3242* (2013.01); *H04L 63/00* (2013.01); *H04L 65/60* (2013.01); *H04L 2209/38* (2013.01)

(58) Field of Classification Search
CPC .............. H04L 65/60; H04L 9/32; H04L 9/18; H04L 2209/38; H04L 9/3242
See application file for complete search history.

(56) References Cited

U.S. PATENT DOCUMENTS

| | | | | |
|---|---|---|---|---|
| 4,893,339 A * | 1/1990 | Bright | ...................... | H04K 1/02 380/269 |
| 6,226,742 B1 * | 5/2001 | Jakubowski | .......... | H04L 9/0625 380/37 |
| 8,874,926 B1 * | 10/2014 | Edwards | ................. | G06F 21/75 713/180 |
| 2003/0039357 A1 * | 2/2003 | Alten | ...................... | G06F 7/582 380/46 |
| 2004/0196975 A1 * | 10/2004 | Zhu | ...................... | H04N 7/1675 380/258 |
| 2005/0213752 A1 * | 9/2005 | Hawkes | ................... | H04L 9/32 380/28 |
| 2008/0063204 A1 * | 3/2008 | Braskich | ............... | H04L 9/0836 380/270 |
| 2009/0327716 A1 * | 12/2009 | Raju | ..................... | H04L 9/3242 713/168 |
| 2013/0212407 A1 * | 8/2013 | Walton | .................... | G06F 21/72 713/190 |
| 2015/0082399 A1 * | 3/2015 | Wu | ..................... | G06F 21/6209 726/6 |

* cited by examiner

*Primary Examiner* — Jayesh Jhaveri
(74) *Attorney, Agent, or Firm* — Fletcher Yoder, P.C.

(57) ABSTRACT

Methods and systems are provided for securely authenticating data of an integrated circuit. By authenticating data having keystream blocks inserted between ciphertext portions, it becomes more difficult to mount successful authentication-based attacks.

18 Claims, 7 Drawing Sheets

_US 9,577,822 B1_

SECURE BITSTREAM AUTHENTICATION

CROSS-REFERENCE

This application claims the benefit of U.S. Provisional Applications Nos. 61/744,825 and 61/744,879, both filed Oct. 3, 2012, the contents of which are incorporated by reference in their entirety.

STATEMENT REGARDING FEDERALLY SPONSORED RESEARCH OR DEVELOPMENT

This invention was made with government support under contract number N41756-11-C-4004 awarded by the Navy Engineering Logistics Office. The government may have certain rights in the invention.

FIELD OF THE INVENTION

This disclosure relates to methods and systems for securing an integrated device against security attacks.

BACKGROUND OF THE INVENTION

Cryptographic algorithms provide classes of encryption and decryption schemes for securing data. Encryption is often implemented with a block cipher, e.g., the Advanced Encryption Standard (AES), in which data is portioned into fixed-sized ciphertext blocks (typically 128-bits), and each block is decrypted with a decryption key. The internal implementation of a block cipher is typically divided into multiple rounds per ciphertext block, where each round uses an expanded round-key that is derived from the encryption key (e.g., AES-256 uses 14 rounds per ciphertext block). In one common mode of operation, the block cipher is used with the NIST Counter Mode, where the value of an incrementing counter is encrypted to create keystream blocks, and those keystream blocks are combined (e.g., XORed) with plaintext blocks to generate corresponding ciphertext blocks.

Commonly-assigned U.S. Pat. Nos. 5,768,372 and 5,915,017, each of which is hereby incorporated by reference herein in its respective entirety, describe the encryption of configuration data stored in nonvolatile storage and its decryption upon loading into a programmable device, including provision of an indicator to signal to the decryption circuit which of several possible encryption/decryption schemes was used to encrypt the configuration data and therefore should be used to decrypt the configuration data.

Someone intent on changing the operation of an integrated circuit without authorization may achieve his or her goal by substituting different programming of the integrated circuit. As merely one example, an attacker may replace or reprogram storage containing data for configuring at least parts of a programmable device. This may result in the programmable device loading unauthorized configuration data on its next power-up event. Programmable devices are frequently reconfigurable or partially reconfigurable during normal operation, so it may even be possible for the attacker to illicitly replace the configuration data in the storage and cause a reconfiguration without a power-up event.

To prevent such attacks, configuration data may be authenticated by inclusion of an authentication tag. The authentication tag may be based on a private authentication key that, in some cases, is programmed into the device. For example, the authentication tag could be generated with a known NIST HMAC algorithm based on a NIST SHA2 hash function. The device may then use its programmed private authentication key and the same authentication algorithm, e.g., HMAC, to verify that the authentication tag in the configuration data is valid, and thereby confirm that the configuration bitstream has not been tampered with.

One problem with this approach, however, is that an attacker may be able to extract the programmed authentication key from the device, and then generate a valid authentication tag for an unauthorized configuration bitstream. The attacker may extract the authentication key using various side-channel analysis (SCA) techniques, for example, by applying statistical analysis to side-channel information emitted from the device, such as power-supply fluctuations or electromagnetic emanations. Once the attacker is able to extract sufficient information about the internal state of the authentication process, he or she can mount attacks by spoofing authentication tags. An illustrative attack against HMAC authentication is described in the following article entitled "Differential Power Analysis of HMAC based on SHA-2, and Countermeasures" McEvoy, R. P., Tunstall, M., Murphy, C., and Marnane, W., WISA 07: 8th International Workshop on Information Security.

SUMMARY OF THE INVENTION

The present disclosure relates to systems and methods for protecting an integrated circuit, and in particular for securely authenticating data in an integrated circuit.

According to some embodiments, systems and methods are provided for authenticating data. Ciphertext frames are interleaved with keystream portions, to generate interleaved frames. Each interleaved frame includes a respective ciphertext frame combined with a respective keystream portion. An authentication operation is performed on the generated interleaved frames to generate an authentication value that authenticates the ciphertext frames.

According to some embodiments, systems and methods are provided for authenticating data. Ciphertext frames are de-interleaved to extract an authentication tag. The de-interleaved ciphertext frames are interleaved with a plurality of keystream portions, to generate interleaved frames. Each interleaved frame includes a respective ciphertext frame combined with a respective keystream portion. The interleaved frames are authenticated to generate a signature tag, which is compared with the extracted authentication tag. In response to the signature tag matching the extracted tag, the ciphertext frames are decrypted.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
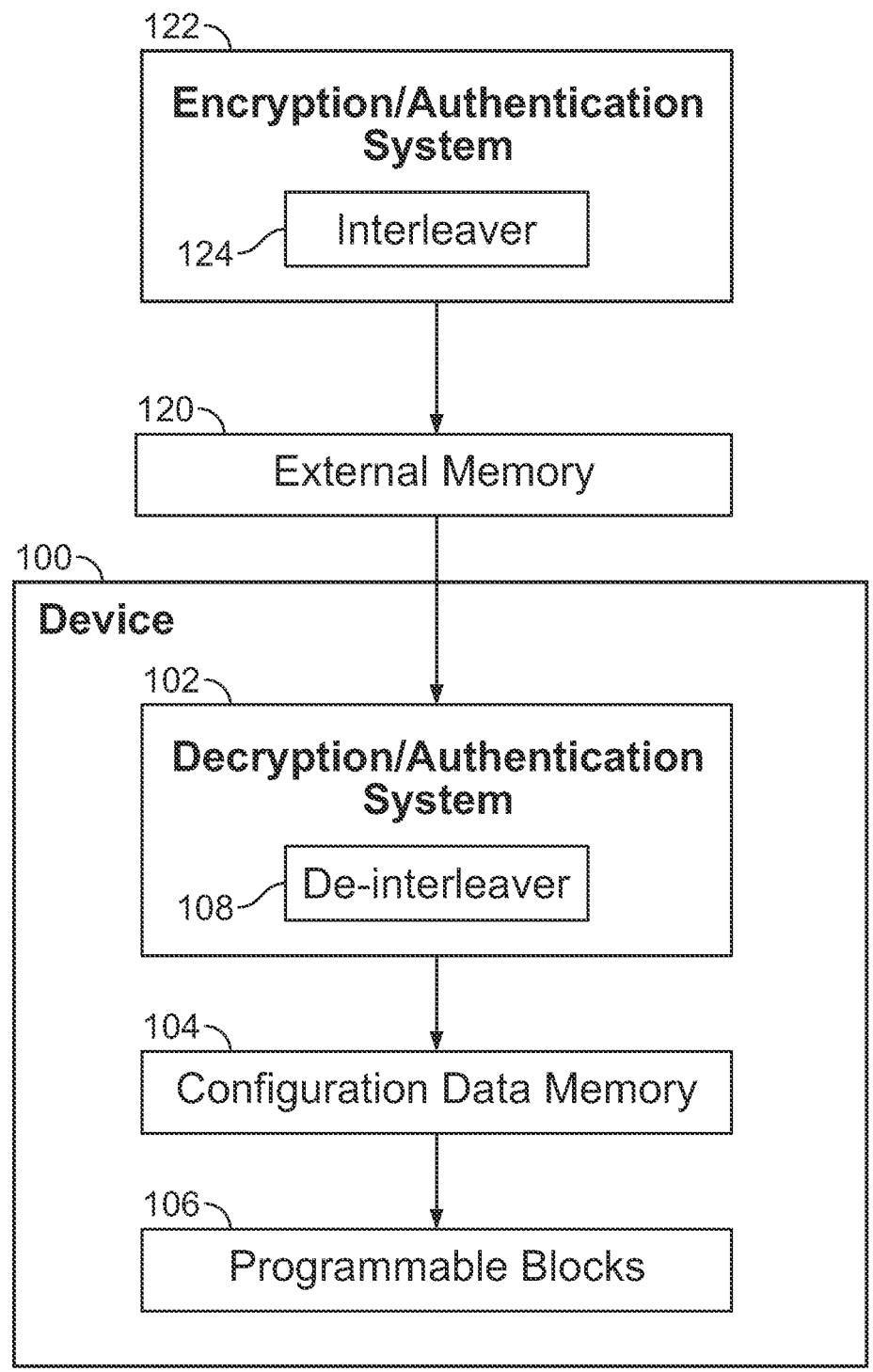
FIG. 1 shows an exemplary block diagram of a programmable device as an example of an integrated circuit device in which embodiments of the present invention may be implemented.

FIG. 1 shows an exemplary block diagram of a programmable device 100 as an example of an integrated circuit device in which embodiments of the present invention may be implemented. An external memory 120 contains configuration data, typically including proprietary designs, that is used to configure the functionality of the device 100. The configuration data is merely one example of data which an owner desires to secure. The configuration of device 100 may occur upon powering up the device, rebooting the device, reconfiguring the device during its operation, or at some other re-programming time. For example, upon powering up, the configuration data may be sent from the external memory 120 to the device 100. The configuration data may be stored in external memory 120 in encrypted and/or authenticated form. For example, the configuration data may be encrypted in order to prevent copying when the data is in storage and/or in transit, e.g., using an encryption/authentication system 122. The configuration data may be authenticated in order to verify that data has not been tampered with, using encryption/authentication system 122.

Encryption/authentication system 122 is merely one example of a system that may be used for carrying out encryption and/or authentication operations disclosed herein, and it should be understood that other configurations are possible without departing from the scope of this disclosure. For example, encryption/authentication system 122 may be implemented in software and/or hardware, using any suitable configuration. In some implementations, encryption/authentication system 122 may be implemented as a standalone encryption system and/or a standalone authentication system that may or may not be coupled. Also, although encryption/authentication system 122 is shown as external to both the memory 120 and device 100, at least parts of encryption/authentication system 122 may be internal to or implemented on either one of the memory 120 and device 100, or may be placed between external memory 120 and device 100 without departing from the scope of this disclosure.

The encrypted/authenticated data stored in external memory 122 is sent to device 100 where it is decrypted/authenticated by a decryption/authentication system 102. The decrypted/authenticated data may then be optionally stored, e.g., in configuration data memory 104. Like encryption/authentication system 122, decryption/authentication system 102 may be implemented in software and/or hardware.

The configuration data is used to configure the functionality of programmable blocks 106. After configuration, the blocks may start operating on input data according to the configuration bitstream. When in operation, the configurable blocks may store internal data, e.g., in data registers, RAM, or other suitable storage. This internal data may reflect specific aspects of the configuration data. For example, in some devices, the internal data may reflect proprietary aspects of the circuit design that the designer may desire to keep secret.

In some embodiments, the security of authentication operations may be increased using various types of interleaving functions and/or de-interleaving functions. These functions may be carried out in interleaver 124 of encryption/authentication system 122 and/or de-interleaver 108 in decryption/authentication system 102. Details of these operations will be disclosed further below.

In some embodiments, the configuration data (in plaintext form) may be encrypted using an encryption cryptographic system that applies a cryptographic algorithm, similar to encryption/authentication system 122. The decryption/authentication system 102 may then decrypt the encrypted data (i.e., ciphertext) using a corresponding decryption cryptographic system that applies the same cryptographic algorithm.

Figure 2:
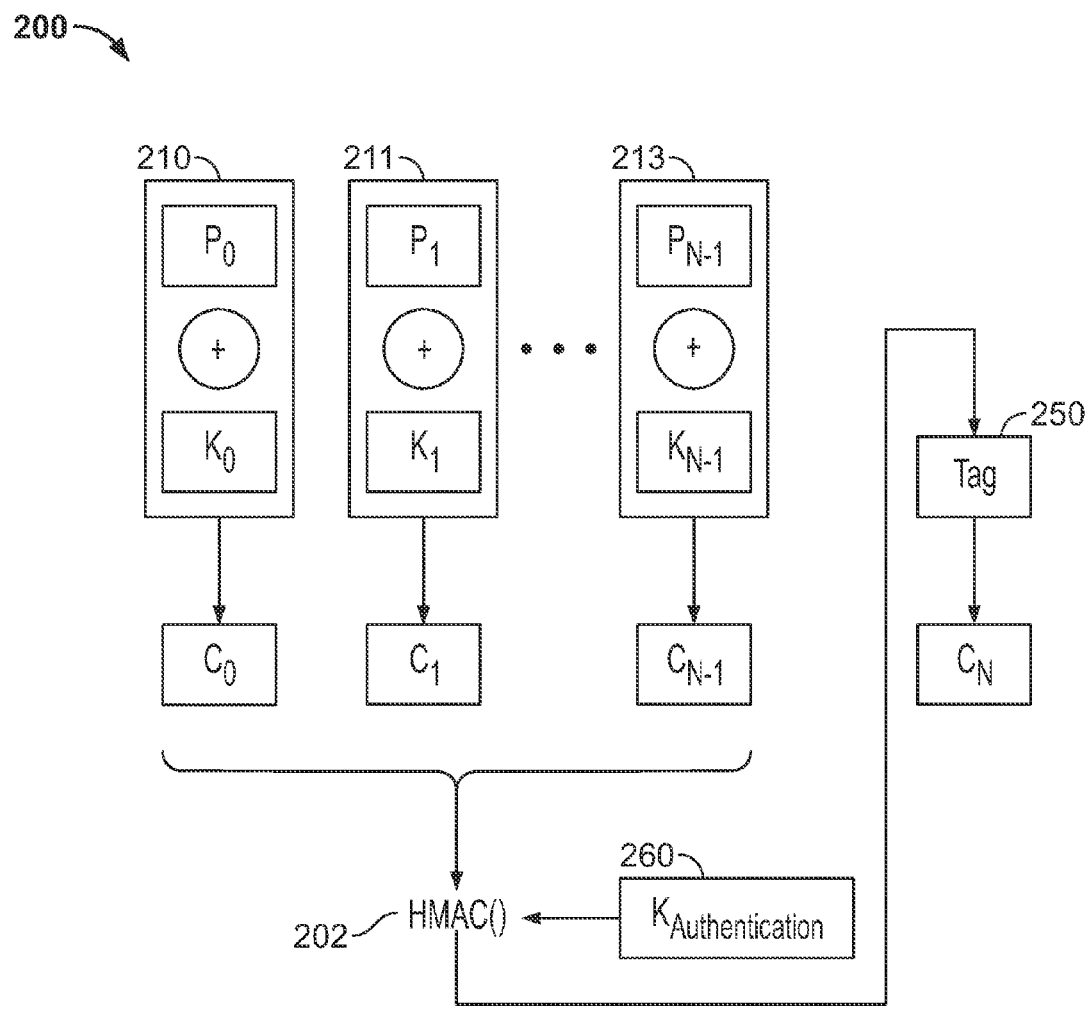
FIG. 2 is an exemplary block diagram representing a known authentication operation.

FIG. 2 illustrates a known authentication technique using a commonly known cryptographic algorithm AES and a commonly known authentication algorithm HMAC. This technique may be implemented, for example, in encryption/authentication system 122 of FIG. 1.

The common cryptographic algorithm of FIG. 2, AES, is a symmetric key block cipher algorithm adopted by the Department of Commerce, National Institute of Standards and Technology (NIST). (See detailed specification in "Federal Information Processing Standards Publication 197" (FIPS 197), of Nov. 26, 2001.) The AES algorithm uses cryptographic keys of 128, 192 and 256 bits to encrypt and decrypt data in blocks of 128 bits. The algorithm iterates a number of nearly identical rounds depending on key length and block size. AES128 uses 10 rounds (N=10), AES192 uses 12 rounds (N=12) and AES256 uses 14 rounds (N=14) to complete an encryption or decryption operation.

FIG. 2 illustrates three illustrative encryption operations 210, 211, and 213 for a first, second, and last plaintext blocks, respectively. According to these operations of FIG. 2, plaintext blocks $\{P_0, P_1, \ldots, P_{N-1}\}$ are respectively combined (e.g., XOR-ed) with round keys $\{K_0, K_1, \ldots, K_{N-1}\}$ to generate ciphertext blocks $\{C_0, C_1, \ldots, C_{N-1}\}$. N may refer to the number of rounds of the particular AES implementation.

The common authentication algorithm of FIG. 2, NIST HMAC, is based on a hash function such as a NIST SHA2. The HMAC algorithm may be used to authenticate data such as ciphertext blocks $\{C_0, C_1, \ldots, C_{N-1}\}$, by generating a tag 250 that may be added to the end of the ciphertext blocks $\{C_0, C_1, \ldots, C_{N-1}\}$ as authentication block $C_N$. The authentication tag 250 may be based on a private authentication key 260 that, in some cases, is programmed into the device 100. The device 100 may then use its programmed private authentication key to verify that the authentication tag 250 is valid for the ciphertext blocks $\{C_0, C_1, \ldots, C_{N-1}\}$, and thereby confirm that these blocks $\{C_0, C_1, \ldots, C_{N-1}\}$ have not been tampered with. For example, device 100 may generate its own authenticating tag $C_N^{DECRYPT}$ and decrypt data only in response to $C_N^{DECRYPT}$ matching $C_N$. Such a matching tag is referred to as a valid authentication tag.

Although the remainder of this specification will mainly discuss the HMAC embodiment, it should be understood that embodiments of the invention described herein are applicable to other authentication algorithms as well as to other cryptographic algorithms and modes of operation. As such, discussing the embodiments with respect to HMAC is meant for the purposes of illustration not limitation. Furthermore, although the remainder of this specification will mainly discuss the AES embodiment, it should be understood that embodiments of the invention described herein are applicable to other key lengths and block sizes as well as to other cryptographic algorithms and modes of operation. As such, discussing the embodiments with respect to AES cryptographic algorithm is meant for the purposes of illustration not limitation.

Systems and methods discussed herein may prevent or increase the difficulty for an attacker to spoof authentication tags, e.g., to append a valid authentication block $E_N$ to an unauthorized ciphertext stream $\{E_1, E_2, \ldots, E_{N-1}\}$. A valid authentication block $E_N$ will be referred to as a valid spoofed authentication tag, and the combination of the unauthorized ciphertext stream with the tag $\{E_1, E_2, \ldots, E_{N-1}, E_N\}$ will be referred to as a spoofed frame.

In one aspect, embodiments of the present disclosure may increase the number of side-channel attacks required by an attacker to generate a valid spoofed authentication tag or a valid spoofed frame. Instead of simply authenticating ciphertext blocks as shown in FIG. 2, systems and methods described herein may interleave keystream blocks at one or more positions of a ciphertext stream. A keystream as used herein is a stream of elements, in general random or pseudo-random, that may be combined (e.g., XORed) with a plaintext block to produce a ciphertext block. These elements may be represented by bits, bytes, numbers, letters, characters, or any suitable symbol depending on the implementation. A keystream block is any suitable group of such elements.

By interleaving keystream blocks, systems and methods described herein may effectively change the authentication key (i.e., rekey) the authentication algorithm after processing each portion of the data to be authenticated. In this way, mounting successful attacks may require the attacker to trigger each of multiple portions of the data to be authenticated, and not just a single authentication tag. Furthermore, attacks such as spoofing a ciphertext frame may require the attacker to trigger the authentication tag for every spoofed frame. Thus, even if the attacker is able to mount a successful attack against one ciphertext frame, he or she may still fail to create multiple spoofed frames.

Figure 3:
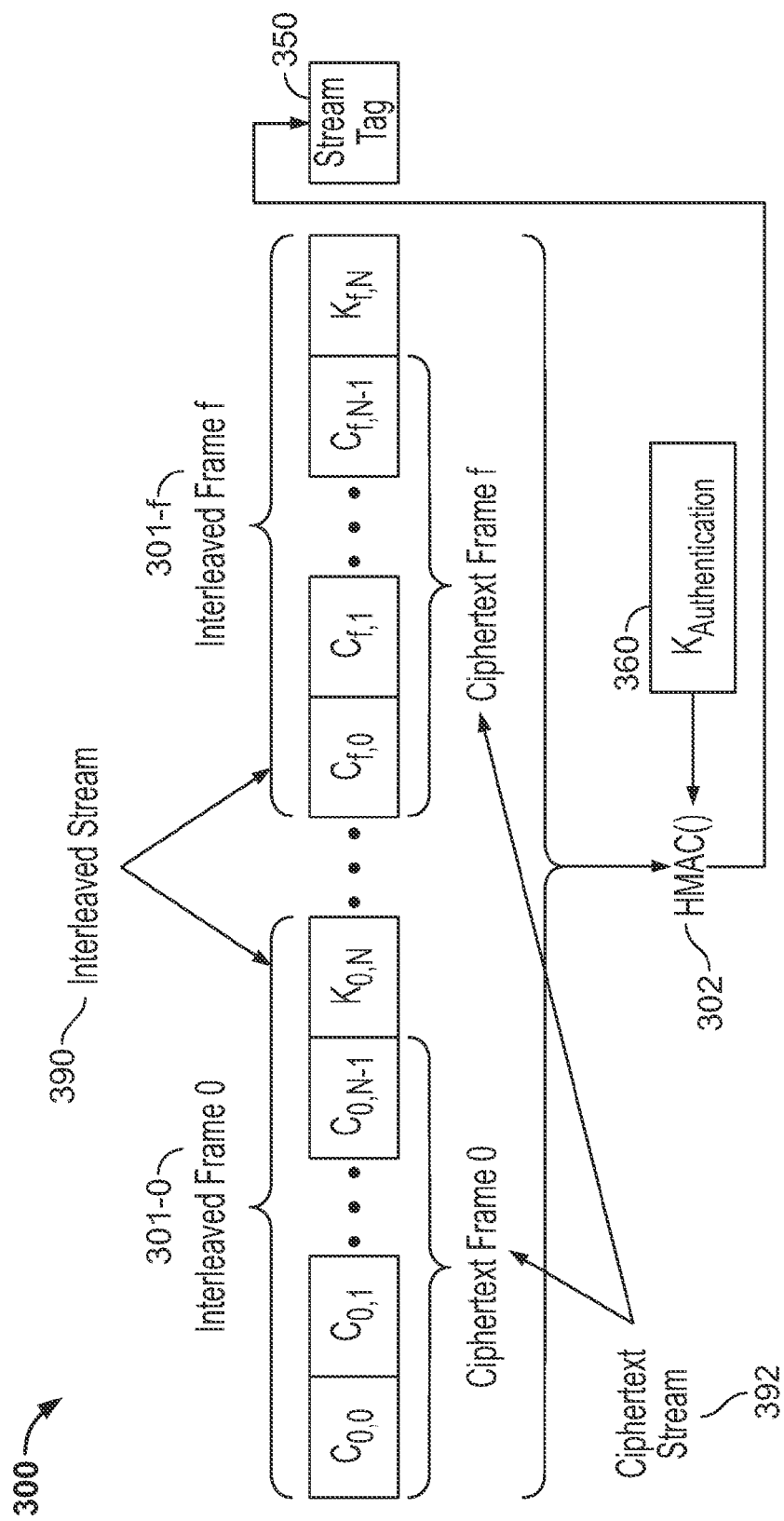
FIG. 3 is an exemplary block diagram representing stream authentication operations according to some embodiments.

FIG. 3 is an exemplary block diagram representing stream authentication operation 300 according to some embodiments. The authentication operation 300 may be used to protect a stream of ciphertext blocks $C_{i,j}$ (i=0, ..., f; j=0, ..., N−1) against an authentication-based attack. Authentication operation 300 may be performed by an authentication system similar to encryption/authentication system 122 of FIG. 1.

Blocks of data may be grouped to form one or more frames. For the purposes of illustration, the rest of this disclosure will mainly discuss frames having the same number of blocks per frame, e.g., ciphertext frames having N ciphertext blocks per frame and interleaved frames having N ciphertext blocks and 1 keystream block per frame. However, it should be understood that these frames may be of different length and/or contain data portions of any suitable size or type without departing from the scope of this disclosure.

FIG. 3 depicts two illustrative interleaved frames of interleaved stream 390: Interleaved Frame 0 (labeled 301-0) and Interleaved Frame F (labeled 301-F). Illustrative Interleaved Frame 0 has N ciphertext blocks $C_{0,0}$ through $C_{0,N-1}$ (corresponding to Ciphertext Frame 0) combined with keystream block $K_{0,N}$. Similarly, Interleaved Frame F has N ciphertext blocks $C_{f,0}$ through $C_{f,N-1}$ (corresponding to Ciphertext Frame 1) combined with keystream block $K_{f,N}$. The ciphertext frames (e.g., Ciphertext Frame 0 and Ciphertext Frame 1) may have been generated from plaintext as described above, or in any suitable way.

Although each interleaved frame has one keystream block appended at the end of the frame, it should be understood that different numbers and different positions of the keystream block relative to the ciphertext frame may be used without departing from the scope of the disclosure.

As illustrated in FIG. 3, keystream blocks $K_{i,N}$ (i=0, ..., f) are inserted among the ciphertext blocks. In some implementations, the keystream blocks $K_{i,N}$ are internal to device 100, and are not part of the bitstream. For example, the keystream blocks $K_{i,N}$ may be completely independent of the plaintext stream or of its corresponding ciphertext stream.

According to some embodiments, an authentication algorithm, e.g., HMAC, is run on the interleaved stream 390, which includes the combination of ciphertext blocks $C_{i,j}$ (i.e., the ciphertext stream 392) interleaved with keystream blocks $K_{i,N}$. The authentication algorithm may use an internal authentication key 360 to run the authentication operations. By processing the interleaved stream 390, the authentication algorithm generates a stream authentication tag 350. A stream tag herein refers to an authentication value corresponding to multiple frames. In the illustrative case of FIG. 3, stream authentication tag 350 is a stream-level authentication value that authenticates interleaved stream 390. For example, the input to the authentication algorithm may include all the blocks of each frame i (i=0, ..., f), including all ciphertext and all keystream blocks up to that frame. By interleaving keystream blocks with ciphertext blocks in this manner, the authentication algorithm is effectively rekeyed after processing every frame using the hidden keystream block as an authentication key.

Figure 4:
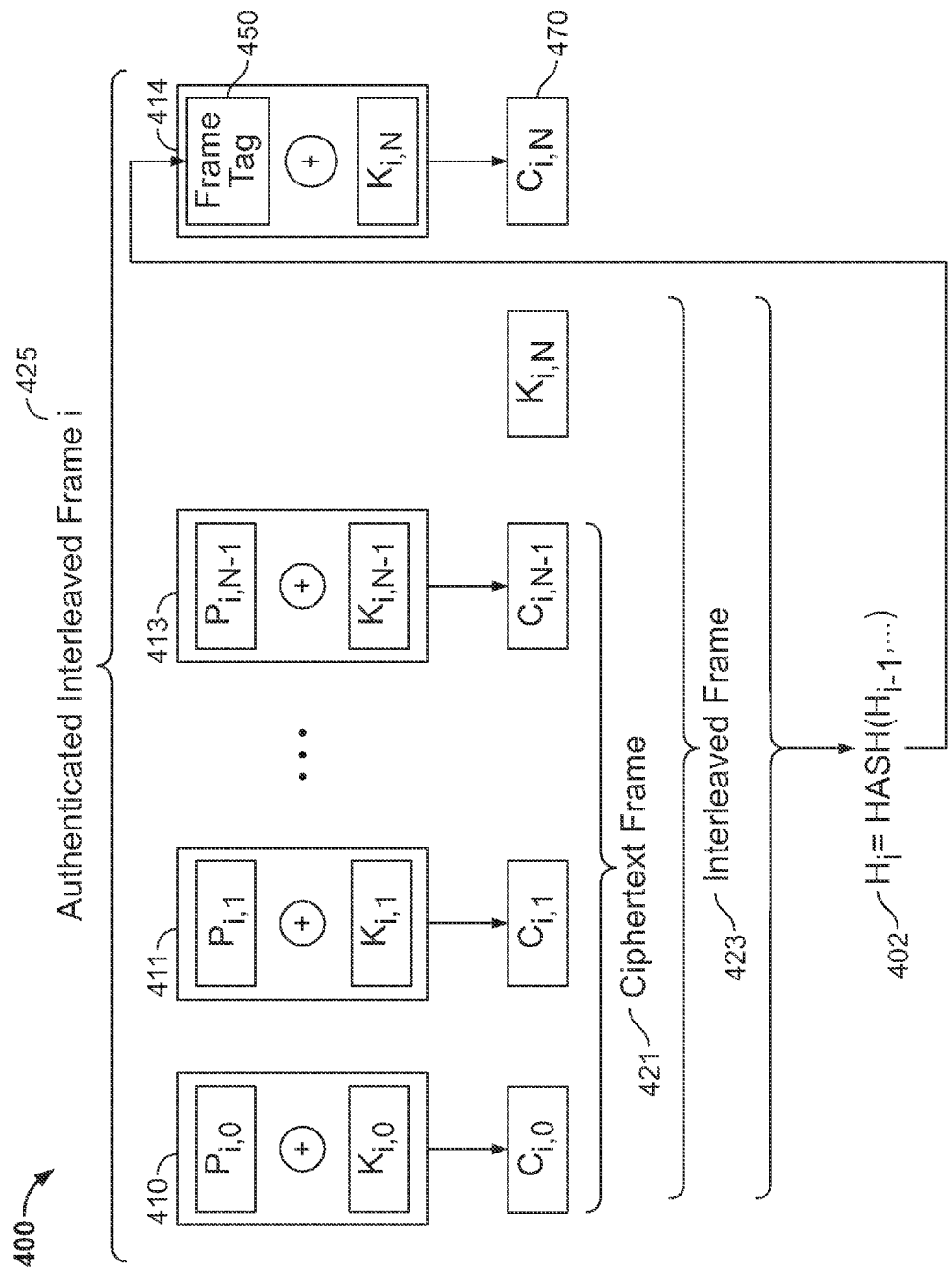
FIG. 4 is an exemplary block diagram representing frame authentication operations according to some embodiments.

FIG. 4 is an exemplary block diagram representing frame authentication operations 400 according to some embodiments. FIG. 4 illustrates such operations on one exemplary data frame i. In some implementations, frame authentication operations 400 may be performed as part of, instead of, or in addition to stream authentication operations 300 of FIG. 3. It should be understood that the operations described with reference to FIG. 4 may apply to any number of frames i (i≥0) without departing from the scope of this disclosure. Authentication operation 400 may be performed by authentication circuitry similar to encryption/authentication system 122 of FIG. 1.

In FIG. 4, ciphertext blocks $C_{i,0}, C_{i,1}, \ldots, C_{i,N-1}$ are generated by encrypting plaintext blocks $P_{i,0}, P_{i,1}, P_{i,N-1}$, respectively, using keystream blocks $K_{i,0}, K_{1,N-1}$. These operations are illustrated as 410, 411, and 413, respectively.

Keystream block $K_{i,N}$ is inserted at the end of the ciphertext frame 421 to create an interleaved frame 423, e.g., as described with reference to FIG. 3 above. In some embodiments, an encrypted intermediate frame authentication tag $C_{i,N}$ (labeled 470) is generated and may be added at the end of interleaved frame 423 to generate an authenticated interleaved frame 425. This operation may be done for each of multiple frames i of a ciphertext stream similar to ciphertext stream 392 of FIG. 3. In this way, authenticating a ciphertext stream may involve confirming not only that the stream authentication tag is valid, but also that each frame authentication tag $C_{i,N}$ for each frame i is valid.

As illustrated in FIG. 4, the frame authentication tag $C_{i,N}$ is generated by encrypting the value of frame authentication tag 450, as shown by operation 414. The frame authentication tag 450 may be computed based on ciphertext blocks included not only in frame i, but also in one or more previously authenticated frames i' (i'<i). For example, the frame authentication tag 450 may be computed based on ciphertext blocks of the ciphertext stream up to the end of frame i. An exemplary computation of frame authentication tag 450 is discussed below.

In the implementation illustrated in FIG. 4, frame authentication tag 450 is generated from computing a hash value $H_i$ (labeled 402) as follows, $$H_i = \text{HASH}(H_{i-1}, C_{i,0}, C_{i,1}, \ldots, C_{i,N-1}, K_{i,N}).$$

Because the computation of involves the hash $H_{i-1}$ of the previous frame i−1, the value of the frame authentication tag 450 (and its encrypted value 470) may depend not only on the interleaved frame 423, but also on one or more previous frames, e.g., frame i−1. In one implementation, in order for a ciphertext stream $\{C_{0,0}, C_{0,1}, C_{0,N-1}, \ldots, C_{f,0}, C_{f,1}, \ldots, C_{f,N-1}\}$ to be authenticated, each of the individual frame tags $C_{i,N}$ (i=0, f) must be valid, as well as the stream-level authentication tag, e.g., $\text{HMAC}(C_{0,0}, C_{0,1}, \ldots, C_{0,N-1}, K_{0,N}, \ldots, C_{f,0}, C_{f,1}, \ldots, C_{f,N-1}, K_{f,N})$.

In some embodiments, the encrypted frame authentication tag may be used one-bit-at-a-time to scramble the keys used to encrypt or authenticate subsequent frames. One-bit-at-a-time scrambling operations are described in U.S. application Ser. No. 14/025,697, filed Sep. 12, 2013, entitled "SECURE VARIABLE SCRAMBLING," the content of which is incorporated by reference in its entirety.

In some embodiments, decrypting a ciphertext portion of a frame may be delayed until a subsequent frame has been authenticated. For example, combining the ciphertext portion and the keystream portion for a frame i for the purpose of determining the corresponding plaintext of that frame i may be delayed until the frame authentication tag for a subsequent frame i+1 has been validated.

Systems and methods using frame authentication described herein may increase security of integrated circuits against authentication-based attacks. Because spoofing the frame authentication tag for a frame i will generally scramble the key used to encrypt the frame authentication tag of the subsequent frame (e.g., by affecting hash value $H_i$), spoofing a frame may require mounting two successful attacks against two authentication tags, the frame tag for the spoofed frame and the encrypted tag for the subsequent frame.

Even if an attacker successfully spoofs a single pair of authentication tags, systems and methods using frame authentication described herein may prevent him or her from creating multiple, other spoofed frames from the spoofed pair of authentication tags. This is because each spoofed frame may now require making other separate, successful attacks on the frame authentication tag of the subsequent frame in order to generate additional spoofed frames.

Several aspects of interleaving/de-interleaving are envisioned in this disclosure. In one aspect, interleaving of data occurs when data is encrypted, e.g., before the configuration data of FIG. 1 is ever stored in external memory 120. Such interleaving is usually performed by a software tool, though it may also be implemented, at least in part, in hardware.

Figures 8, 9:
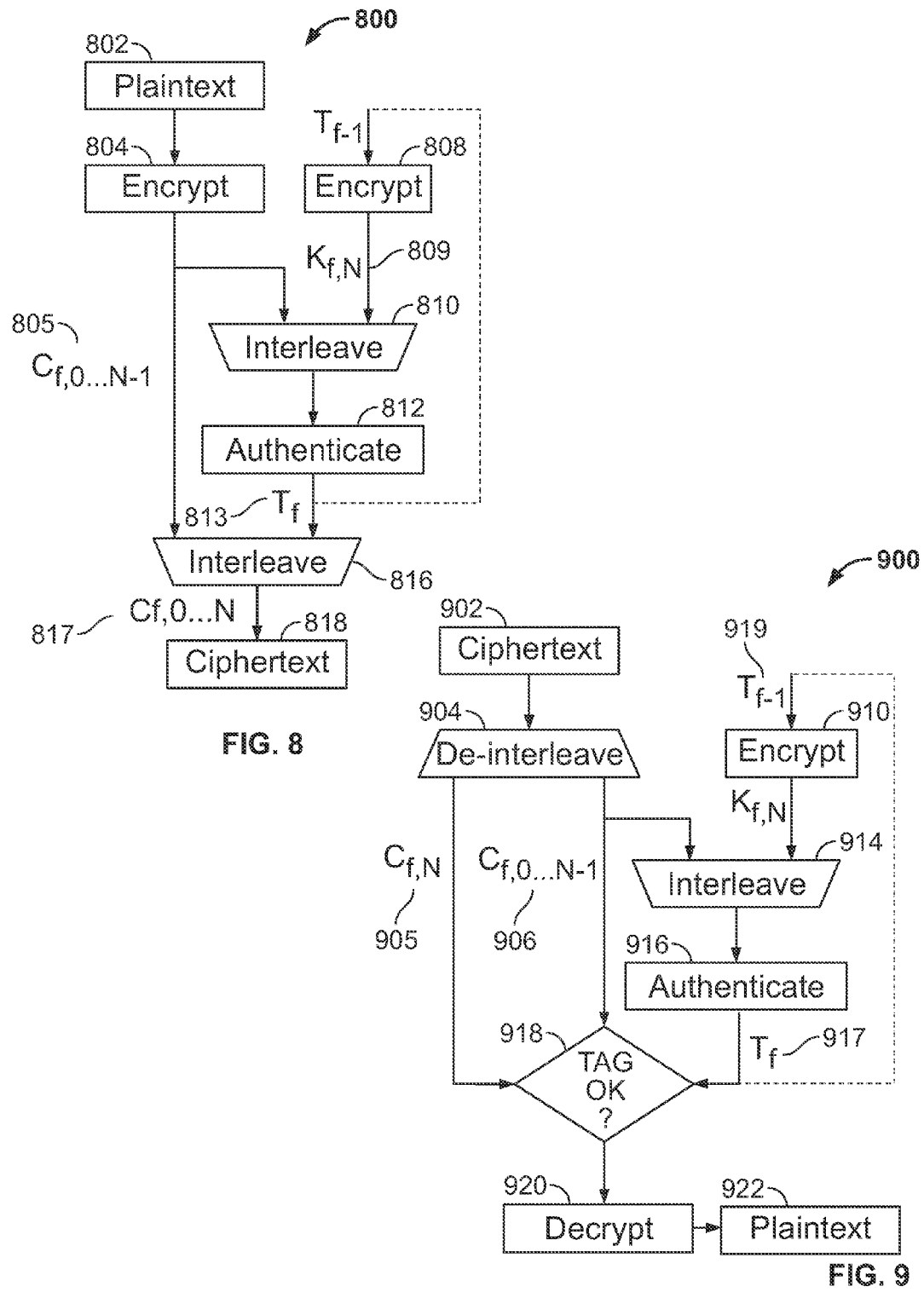
FIG. 8 shows another exemplary interleaving/de-interleaving process for processing data according to some embodiments.
FIG. 9 shows another exemplary interleaving/de-interleaving process for processing data according to some embodiments.

According to this aspect of interleaving, the interleaving process includes encrypting the plaintext to create ciphertext, interleaving the ciphertext with keystream data, authenticating the interleaved ciphertext and keystream data to compute an encrypted authentication tag, and then interleaving the ciphertext with the resulting encrypted authentication tag (which may replace the previously interlaced keystream data). Embodiments of this process are shown in FIGS. 5 and 8, described in detail below.

Figure 5:
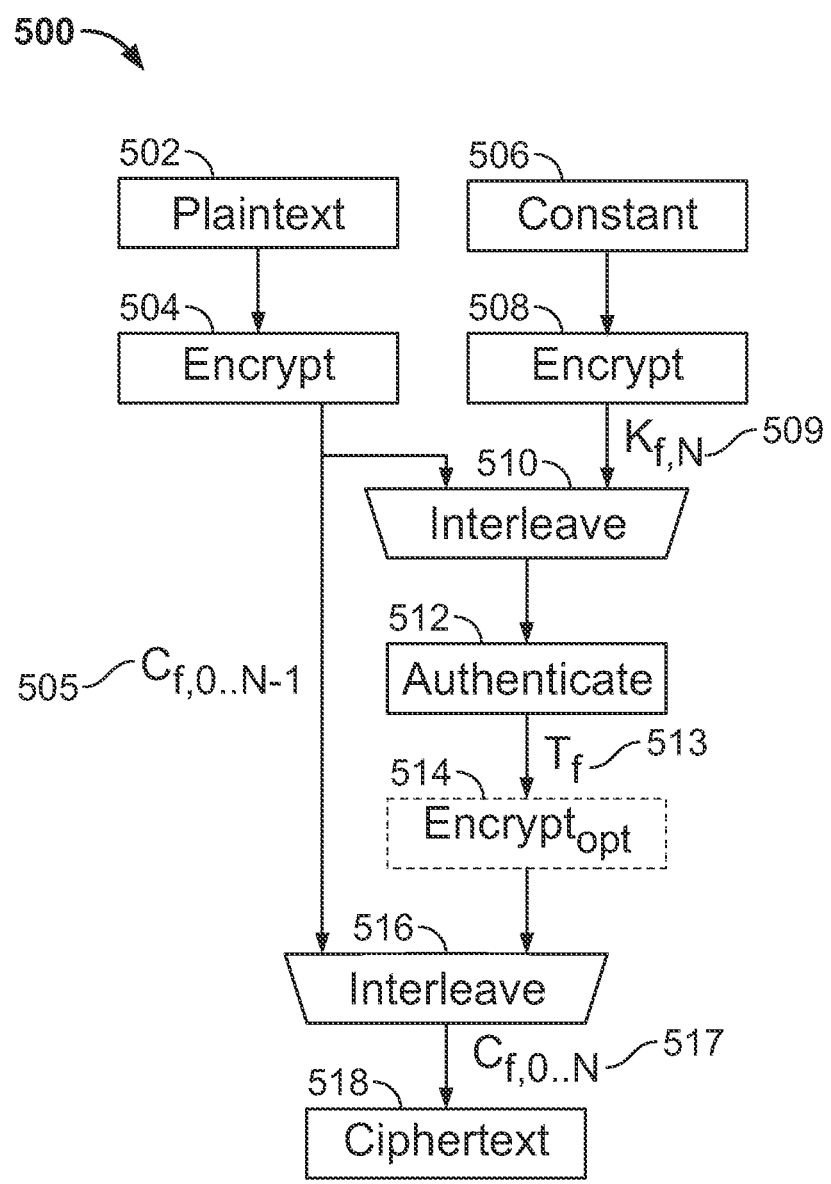
FIG. 5 shows an exemplary interleaving/de-interleaving process for processing data according to some embodiments.

FIG. 5 shows an exemplary interleaving process 500 for processing data according to some embodiments. In some embodiments, process 500 may be implemented by software, such as the one represented by interleaver block 124 and encryption/authentication system 122 of FIG. 1. In some embodiments, process 500 may also or in addition be implemented by hardware.

Process 500 processes and generates data, similar to plaintext blocks, ciphertext blocks and/or keystream blocks of FIGS. 3 and/or 4. Process 500 may be performed in a programmable logic device such an FPGA and/or PLD, for encrypting/authenticating data comprising configuration bitstream. Process 500 may also be implemented in any integrated circuit including ASSP, an ASIC, a full-custom chip, and/or a dedicated chip.

Plaintext 502 is encrypted at 504 to generate ciphertext data 505. For example, plaintext blocks $P_{i,j=0 \ldots N-1}$, such as those of FIG. 4, are encrypted at 504 to generate corresponding ciphertext blocks $C_{i,j=0 \ldots N-1}$. The encrypt operation block 504 (and other encryption operations described herein) could use any suitable encryption operation and any mode of encryption, such as but not limited to, NIST Counter Mode or a cipher block chaining (CBC) Mode. For example, although FIGS. 1 and 2 discuss Counter Mode, this is for the purpose of illustration not limitation, and any suitable mode of encryption, implemented in software and/or hardware, may be used without departing from the scope of this disclosure.

A constant value 506 is encrypted at 508 to generate keystream data 509. For example, the constant value may be a random or pseudo-random seed value, or may be provided by the user. Keystream data 509 may include keystream block $K_{i,N}$, which may be similar to keystream block $K_{i,N}$ of FIG. 4.

The ciphertext data 505 and keystream data 509 are interleaved at 510. The interleaving operation block 510 may be implemented in software and/or hardware, and may be implemented using any suitable circuitry, such as multiplexors, logic gates, buffers, shifters, etc. This first interleaving generates interleaved ciphertext and keystream data, e.g., similar to interleaved ciphertext frame 423 of FIG. 4.

The interleaved ciphertext and keystream data is authenticated at 512 to generate an authentication frame tag $T_i$, e.g., similar to frame authentication tag 450 of FIG. 4.

The frame authentication tag $T_i$ is optionally encrypted at 514 to generate an encrypted authentication tag, e.g., similar to encrypted frame authentication tag $C_{i,N}$ 470 of FIG. 4.

The ciphertext data 505 output from encryption operation block 504 and the (optionally encrypted) authentication tag output from authentication operation block 512 are interleaved at 516. This second interleaving may be implemented similarly to the first interleaving. This second interleaving generates authenticated interleaved ciphertext data $C_{i,j=0 \ldots N}$, e.g., similar to authenticated interleaved ciphertext frame 425 of FIG. 4. As a result, the second interleaving at 516 replaces the keystream data that was previously interlaced by the first interleaving at 510. Finally, the second interleaving generates authenticated interleaved data that corresponds to the authenticated encrypted form of plaintext 502, in the form of ciphertext 518.

According to another interleaving/de-interleaving aspect, interleaving of data occurs when data is decrypted, e.g., by decryption/authentication system 102 of FIG. 1. According to some embodiments of this aspect, an authentication tag is extracted (or de-interleaved) from an authenticated interleaved ciphertext and replaced with keystream data. The combined ciphertext and keystream data is then authenticated by generating an authentication signature. The resulting authentication signature is compared with the decrypted authentication tag. If the authentication signature matches the authentication tag (i.e., the ciphertext is determined to be authentic), then the ciphertext is de-interleaved from the keystream data and decrypted into plaintext. Embodiments of this aspect are illustrated in FIGS. 6, 7, and 9, described in detail below.

Operations related to this aspect of interleaving/de-interleaving are generally implemented in hardware such as the one represented by decryption/authentication system 102 of FIG. 1, though they may also be implemented at least in part in software without departing from the scope of this disclosure.

Figure 6:
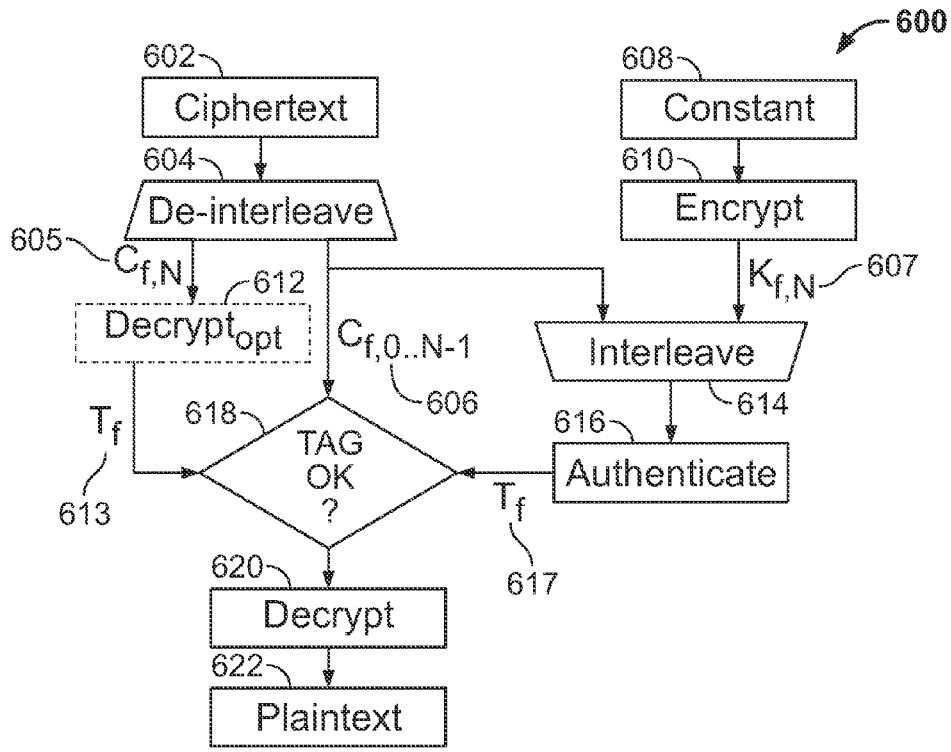
FIG. 6 shows another exemplary interleaving/de-interleaving process for processing data according to some embodiments.
Figure 7:
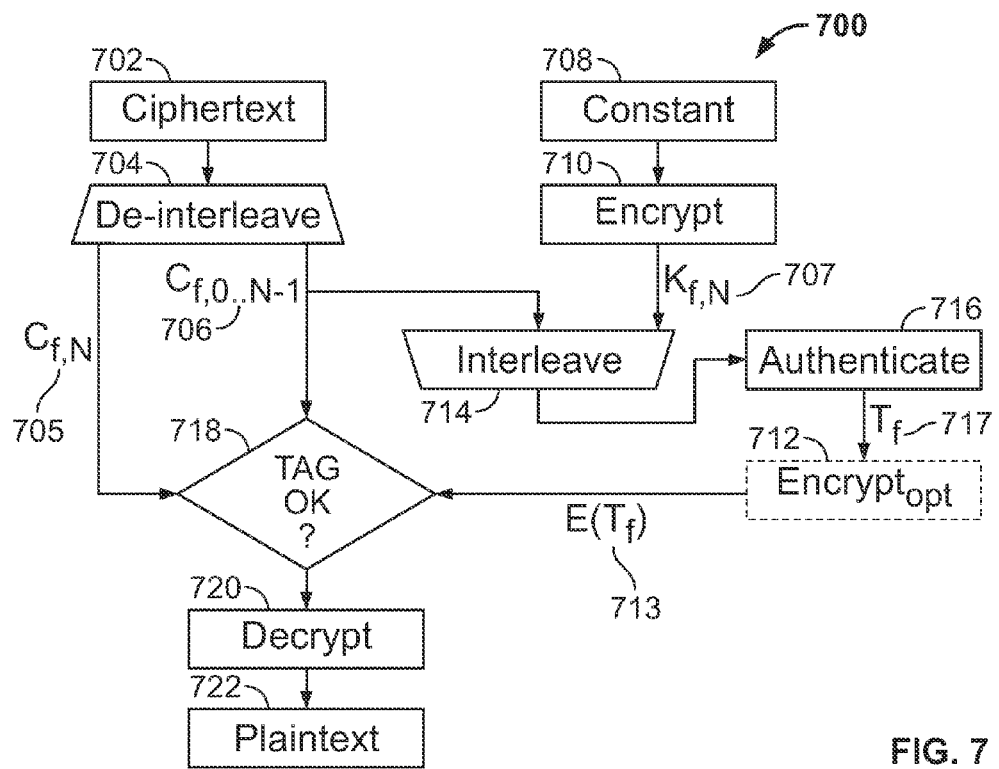
FIG. 7 shows another exemplary interleaving/de-interleaving process for processing data according to some embodiments.

FIG. 6 shows an exemplary interleaving process 600 for processing data according to some embodiments. Process 600 may be implemented in an encryption/decryption system (software and/or hardware) similar to de-interleaver 108 and/or decryption/authentication system 102 of FIG. 1.

Process 600 processes and generates blocks data, similar to plaintext blocks, ciphertext blocks and/or keystream blocks of FIGS. 3 and/or 4. Process 600 may be performed in a programmable logic device such an FPGA and/or PLD, for decrypting/authenticating data comprising configuration bitstream. Process 600 may also be implemented in any integrated circuit including ASSP, an ASIC, a full-custom chip, and/or a dedicated chip.

Ciphertext 602 is de-interleaved at 604 to extract authentication data $C_{i,N}$ and ciphertext data $C_{i,j=0 \ldots N-1}$. For example, an authenticated interleaved frame similar to frame 425 of FIG. 4 is de-interleaved at 604 to extract ciphertext blocks $C_{i,j=0 \ldots N-1}$ and an authentication tag. The authentication tag may be similar to stream authentication tag 350 of FIG. 3, encrypted frame authentication tag $C_{i,N}$ 470 of FIG. 4, or frame authentication tag $T_{i,N}$ 450 of FIG. 4.

If the implementation of process 600 generates an encrypted authentication tag 605, then an optional decryption operation block 612 decrypts the authentication tag 605 to generate an unencrypted authentication tag $T_{i,N}$ 613.

The ciphertext blocks $C_{i,j=0 \ldots N-1}$ are interleaved at 614 with keystream blocks 607 to generate combined ciphertext and keystream data. The keystream data may be generated similarly to process 500 of FIG. 5, e.g., by encrypting (at 610) a constant value 608 to generate keystream data 607. Keystream data 509 may include keystream block $K_{i,N}$, which may be similar to keystream block $K_{i,N}$ of FIG. 4.

The interleaved combination of ciphertext and keystream data is authenticated at 616 by generating a ciphertext signature tag 617, using, e.g., HMAC or any suitable authentication function.

Comparison operation block 618 validates the signature tag, based on comparing:
(1) the decrypted authentication tag 613, extracted from the ciphertext based on the de-interleaving operation at 604; and
(2) the ciphertext signature tag 617, generated based on the interleaving operation at 614.

If the ciphertext signature tag 617 matches the decrypted authentication tag 613, then the ciphertext is determined to be authentic and is decrypted at 620 to generate plaintext 622. If the ciphertext signature tag 617 does not match the decrypted authentication tag 613, then no decryption may be performed.

In some embodiments, rather than comparing the decrypted authentication tag 613 and the ciphertext signature tag 617, the encrypted authentication tag and an encrypted version of the ciphertext signature tag may be compared. FIG. 7 illustrates such a variant. In particular, FIG. 7 illustrates process 700, which is similar to process 600 of FIG. 6, but the (optional) decryption block 612 of FIG. 6 is replaced with an (optional) decryption block 712 in FIG. 7. In this way, the comparison operation block 718 of process 700 validates the signature tag, based on comparing:

(1) the encrypted authentication tag 705, extracted from the ciphertext based on de-interleaving at 704; and
(2) the encrypted ciphertext signature tag 713, generated based on encrypting (at 712) the result of interleaving (at 714) the ciphertext data 706 with the keystream data 707.

In some embodiments, keystream data may be generated using a variable instead of a constant (e.g., such as constants 506 of FIG. 5, 608 of FIG. 6, and 708 of FIG. 7). The variable may be a value generated by the process in a previous round, during an encryption, decryption, authentication, interleaving, de-interleaving, or any other suitable operation. FIGS. 8 and 9 illustrate such a case.

In particular, FIG. 8 depicts a process 800 which is similar to process 500 of FIG. 5, but generates keystream data in a different way. Rather than using constant 506 to generate the keystream data 509 as in process 500 of FIG. 5, process 800 uses a variable which may have been generated as an output from encrypting or authentication a previous frame or a previous block. In the example of FIG. 8, the unencrypted authentication tag $T_{i-1}$ for frame i−1, output at 813, is fed back as input variable 815 to the encryption block 808 when computing the keystream data for frame i.

FIG. 9 depicts a process 900 which is similar to processes 600 and 700 of FIGS. 6 and 7, respectively (omitting the optional decryption block 612 and encryption block 712 for clarity). One difference between process 900 and processes 600/700 is that process 900 generates keystream data from encrypting an authentication signature, such as the unencrypted authentication signature $T_{i-1}$ 919, which may have been generated as output 917 from encrypting or authenticating a previous frame or a previous block.

It will be understood that the above steps of processes 500, 600, 700, 800, and 900 of FIGS. 5, 6, 7, 8, and 9, respectively, may be executed or performed in any order or sequence not limited to the order and sequence shown and described in the figure. Also, some of the above steps of these processes may be executed or performed substantially simultaneously where appropriate or in parallel to reduce latency and processing times.

Although embodiments of this disclosure discuss a software implementation of a first aspect of interleaving (that generates authenticated interleaved encrypted data) and a hardware implementation of a second aspect of interleaving (that checks the authenticity of interleaved data), this is for the purpose of limitation not limitation and any suitable hardware and/or software implementation may be used without departing from the scope of this disclosure.

The encryption/authentication operation implementations described herein may belong to a single processing device or a plurality of processing devices. Such an implementation may have a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

It will be understood that the foregoing is only illustrative of the principles of the invention, and that various modifications can be made by those skilled in the art without departing from the scope and spirit of the invention. For example, the various elements of this invention can be provided on a device in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of authenticating data, the method comprising:
   interleaving, using interleaving circuitry, a plurality of ciphertext frames with a plurality of keystream portions, to generate a plurality of interleaved frames, wherein each interleaved frame from among the plurality of interleaved frames comprises a respective ciphertext frame from among the ciphertext frames combined with a respective keystream portion from among the plurality of keystream portions; and
   performing, using authentication circuitry, an authentication operation on the plurality of generated interleaved frames to generate an authentication value, wherein the authentication value authenticates the plurality of ciphertext frames;
   wherein the method is performed in a programmable device, and wherein the data being authenticated comprises configuration data that configures one or more programmable devices.

2. The method of claim 1, wherein the authentication value comprises a stream authentication tag that authenticates a stream comprising the plurality of ciphertext frames.

3. The method of claim 1, comprising generating, for at least one interleaved frame, a frame authentication tag, wherein the frame authentication tag is generated based on a combination of the ciphertext portion of the interleaved frame and the ciphertext portion of another interleaved frame.

4. The method of claim 2, wherein the plurality of ciphertext frames is authenticated in response to validating the stream authentication tag and validating each frame authentication tag of a plurality of frame authentication tags corresponding to a respective one of the ciphertext frames.

5. The method of claim 3, wherein the frame authentication tag is used one-element-at-a-time to scramble a key value used to authenticate a subsequent ciphertext frame.

6. The method of claim 1, wherein decrypting one ciphertext frame of the plurality of ciphertext frames is delayed until a frame authentication tag for another one of the ciphertext frames has been validated.

7. A system for authenticating data, the system comprising:
   interleaving circuitry that interleaves a plurality of ciphertext frames with a plurality of keystream portions, to generate a plurality of interleaved frames, wherein each interleaved frame from among the plurality of interleaved frames comprises a respective ciphertext frame from among the ciphertext frames combined with a respective keystream portion from among the plurality of keystream portions;
   authentication circuitry that performs an authentication operation on the plurality of generated interleaved frames to generate an authentication value, wherein the authentication value authenticates the plurality of ciphertext frames; and
   a programmable portion, wherein the data being authenticated comprises a configuration bitstream that programs the programmable portion of one or more programmable devices.

8. The system of claim 7, wherein the authentication value comprises a stream authentication tag that authenticates a stream comprising the plurality of ciphertext frames.

9. The system of claim 7, wherein the interleaving circuitry generates, for at least one interleaved frame, a frame authentication tag, wherein the frame authentication tag is generated based on a combination of the ciphertext portion of the interleaved frame and the ciphertext portion of another interleaved frame.

10. The system of claim 8, wherein the plurality of ciphertext frames is authenticated in response to validating the stream authentication tag and validating each frame authentication tag of a plurality of frame authentication tags corresponding to a respective one of the ciphertext frames.

11. The system of claim 9, wherein the frame authentication tag is used one-element-at-a-time to scramble a key value used to authenticate a subsequent ciphertext frame.

12. The system of claim 7, wherein decrypting one ciphertext frame of the plurality of ciphertext frames is delayed until a frame authentication tag for another one of the ciphertext frames has been validated.

13. The system of claim 7, comprising a programmable portion, wherein the data being authenticated comprises a configuration bitstream programs the programmable portion.

14. A method for authenticating data, the method comprising:
   de-interleaving a plurality of ciphertext frames to extract an authentication tag;
   interleaving, using interleaving circuitry, the de-interleaved plurality of ciphertext frames with a plurality of keystream portions, to generate a plurality of interleaved frames, wherein each interleaved frame from among the plurality of interleaved frames comprises a respective ciphertext frame from among the plurality of ciphertext frames combined with a respective keystream portion from among the plurality of keystream portion;
   authenticating, using authentication circuitry, the interleaved frames to generate a signature tag;
   comparing the signature tag with the extracted authentication tag; and
   in response to the signature tag matching the extracted tag, decrypting the ciphertext frames;
   wherein the method is performed in a programmable device, and wherein the data being authenticated comprises configuration data that configures one or more programmable devices.

15. The method of claim 14, wherein authenticating the interleaved frames to generate the signature tag comprises generating, for at least one interleaved frame of the plurality of interleaved frames, a frame authentication tag, wherein the frame authentication tag is generated based on a combination of the ciphertext portion of the interleaved frame of the plurality of interleaved frames and the ciphertext portion of another interleaved frame of the plurality of interleaved frames.

16. The method of claim 14, wherein the keystream portions are generated based on a constant value.

17. The method of claim 14, wherein the keystream portions are generated based on a previous signature tag.

18. The method of claim 14, wherein decrypting one ciphertext frame of the plurality of ciphertext frames is delayed until a frame authentication tag for another one of the ciphertext frames has been validated.

* * * * *